US008490647B2

(12) United States Patent
Guion

(10) Patent No.: US 8,490,647 B2
(45) Date of Patent: Jul. 23, 2013

(54) FLUID PRESSURE CONTROL DEVICE

(76) Inventor: Walter Franklin Guion, Oxnard, CA (US)

( * ) Notice: Subject to any disclaimer, the term of this patent is extended or adjusted under 35 U.S.C. 154(b) by 0 days.

(21) Appl. No.: 13/199,564

(22) Filed: Sep. 3, 2011

(65) Prior Publication Data

US 2012/0000552 A1 Jan. 5, 2012

Related U.S. Application Data

(63) Continuation of application No. 13/135,153, filed on Jun. 27, 2011, which is a continuation-in-part of application No. 12/855,494, filed on Aug. 12, 2010, now abandoned.

(60) Provisional application No. 61/233,160, filed on Aug. 12, 2009.

(51) Int. Cl.
*F16K 31/36* (2006.01)

(52) U.S. Cl.
USPC ............... 137/495; 137/505.11; 137/505.13; 137/505.15; 137/505.25

(58) Field of Classification Search
USPC ............ 137/505.11, 505.13, 505.15, 505.25, 137/494, 495
See application file for complete search history.

(56) References Cited

U.S. PATENT DOCUMENTS

| | | | |
|---|---|---|---|
| 2,141,543 A * | 12/1938 | Mann, Jr. .................... 152/418 |
| 2,600,137 A | 6/1952 | Teague | |
| 3,098,501 A | 7/1963 | McLeod | |
| 3,583,431 A | 6/1971 | Diel | |
| 3,704,727 A | 12/1972 | Adahan | |
| 3,976,067 A * | 8/1976 | Amlong .................... 128/205.24 |
| 3,995,656 A | 12/1976 | Mills | |
| 4,194,522 A | 3/1980 | Lucas et al. | |
| 4,407,323 A | 10/1983 | Neff | |
| 4,716,929 A | 1/1988 | Tomer | |
| 5,522,421 A | 6/1996 | Holt et al. | |
| 5,722,454 A | 3/1998 | Smith et al. | |
| 5,979,496 A | 11/1999 | Markham | |
| 5,996,417 A | 12/1999 | Lund | |
| 6,056,006 A | 5/2000 | Hagerty | |
| 6,170,519 B1 | 1/2001 | Carroll et al. | |
| 6,267,350 B1 | 7/2001 | Siawinski et al. | |
| 6,363,964 B1 | 4/2002 | Carroll | |
| 6,615,865 B1 * | 9/2003 | Eusebi .......................... 137/557 |
| 6,672,332 B2 | 1/2004 | Carroll | |
| 6,851,447 B1 | 2/2005 | Carroll | |
| 6,948,520 B2 | 9/2005 | Carroll | |
| 7,051,755 B2 | 5/2006 | Zuck | |

(Continued)

*Primary Examiner* — William McCalister

(57) ABSTRACT

A fluid pressure regulating apparatus is provided. The apparatus includes a chamber having a first bore diameter, a second bore diameter, a fluid inlet for receiving fluid at an unregulated pressure, and a fluid outlet for discharging fluid at a regulated pressure. A shuttle assembly is located in the chamber, the shuttle assembly including a valve that is in fluid communication with both the fluid inlet and the fluid outlet, and a first sealing member located at an upper portion of the shuttle assembly and a second sealing member located at a lower portion of the shuttle assembly. An unregulated pressure zone communicates with the fluid inlet, a regulated pressure zone communicates with the fluid outlet and a fluid pressure control zone communicates with a portion of the shuttle assembly, the fluid pressure control zone controlling the regulated pressure at the fluid outlet.

12 Claims, 7 Drawing Sheets

U.S. PATENT DOCUMENTS

| | | |
|---|---|---|
| 7,059,343 B2 | 6/2006 | Carroll |
| 7,159,611 B2 | 1/2007 | Larsen |
| 7,293,574 B2 | 11/2007 | Schwartz et al. |
| 7,306,005 B2 | 12/2007 | Moldthan |
| 7,635,005 B2 | 12/2009 | Blankevoort et al. |
| 7,757,703 B2 | 7/2010 | Bell et al. |
| 7,757,710 B2 | 7/2010 | Larsen et al. |
| 2006/0157115 A1* | 7/2006 | Dorogi et al. ............ 137/505.41 |

* cited by examiner

FLUID PRESSURE CONTROL DEVICE

This application claims priority under 35 U.S.C. §120 as a continuation of co-pending U.S. patent application Ser. No. 13/135,153, filed Jun. 27, 2011, entitled "Fluid Pressure Control Device," which is a continuation-in-part of U.S. patent application Ser. No. 12/855,494, filed Aug. 12, 2010, entitled "Fluid Pressure Control Device," now abandoned, which claims priority to U.S. provisional application Ser. No. 61/233,160 filed Aug. 12, 2009, which is referred to and incorporated herein in its entirety by this reference.

FIELD OF THE INVENTION

The present invention generally relates to devices that control fluid pressure. More particularly, the invention concerns a device for regulating fluid pressure.

BACKGROUND OF THE INVENTION

Human attempts to control fluids dates back to the earliest civilizations, including ancient China, Mesopotamia, and ancient Egypt. The modern era generally begins with Benedetto Castelli, who in 1619 published a foundational book of hydrodynamics. Subsequently, Blaise Pascal invented the hydraulic press which multiplied a smaller force acting on a larger area into the application of a larger force totaled over a smaller area, transmitted through the same pressure (or same change of pressure) at both locations. Pascal's law or principle states that for an incompressible fluid at rest, the difference in pressure is proportional to the difference in height and this difference remains the same whether or not the overall pressure of the fluid is changed by applying an external force. This implies that by increasing the pressure at any point in a confined fluid, there is an equal increase at every other point in the container, i.e., any change in pressure applied at any point of the fluid is transmitted undiminished throughout the fluids.

Modern fluid regulating devices are frequently manually set to a desired pressure, then re-adjusted throughout the course of use at various other set pressures. If a new set pressure is below that of a previous regulated pressure setting, the operator is typically required to perform some manner of fluid bleed of the downstream system while also fine tuning the set pressure as desired. In many cases, however, the downstream system is sealed causing the operator to "break" connections or install an auxiliary bleed valve. Further, if it is desired to remove the regulator from the unregulated high pressure source after use, it is commonplace to again perform some manner of downstream fluid bleed in order to discharge high pressure fluid from within the regulator before removal. The continual setting and resetting of pressures and/or regulators is time consuming at best, and dangerous at worst.

Therefore, there remains a need to overcome one or more of the limitations in the above-described, existing art.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE PREFERRED EMBODIMENTS

In the following description, for the purposes of explanation, numerous specific details are set forth in order to provide a thorough understanding of the fluid pressure control device (FPCD) of the present invention. Throughout this description, the embodiments and examples shown should be considered as exemplars, rather than as limitations on the FPCD. That is, the following description provides examples, and the accompanying drawings show various examples for the purposes of illustration. However, these examples should not be construed in a limiting sense as they are merely intended to provide examples of the FPCD rather than to provide an exhaustive list of all possible implementations of the FPCD.

Specific embodiments of the invention will now be further described by the following, non-limiting examples which will serve to illustrate various features. The examples are intended merely to facilitate an understanding of ways in which the invention may be practiced and to further enable those of skill in the art to practice the invention. Accordingly, the examples should not be construed as limiting the scope of the invention.

Generally, the present invention is a device for controlling fluid pressure. Further, the present invention is a device for regulating fluid pressure. That is, the FPCD is a device that provides either a static or flowing fluid source at a desired, constant pressure from a source of unregulated or fluctuating fluid pressure. The present invention is equally applicable to gaseous fluids as well as liquids.

Figure 4A:
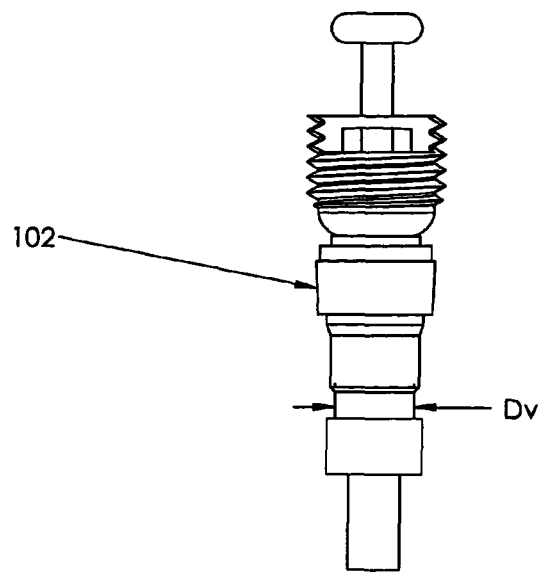
FIG. 4a is a Schrader valve illustrating an exterior configuration used in an embodiment of the present invention.
Figure 4B:
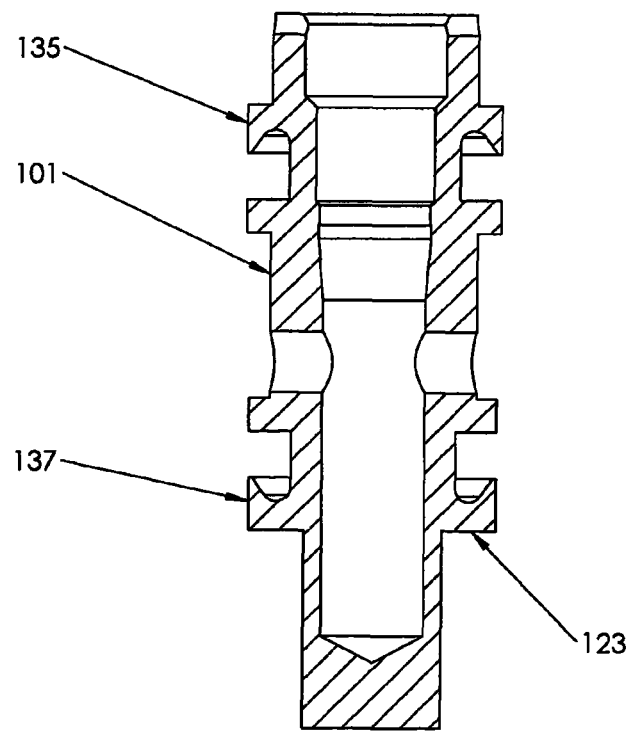
FIG. 4b is a cross sectional view of a shuttle illustrated in FIG. 1 used to contain and secure the Schrader valve shown in FIG. 4a, as used in an embodiment of the present invention.
Figure 5:
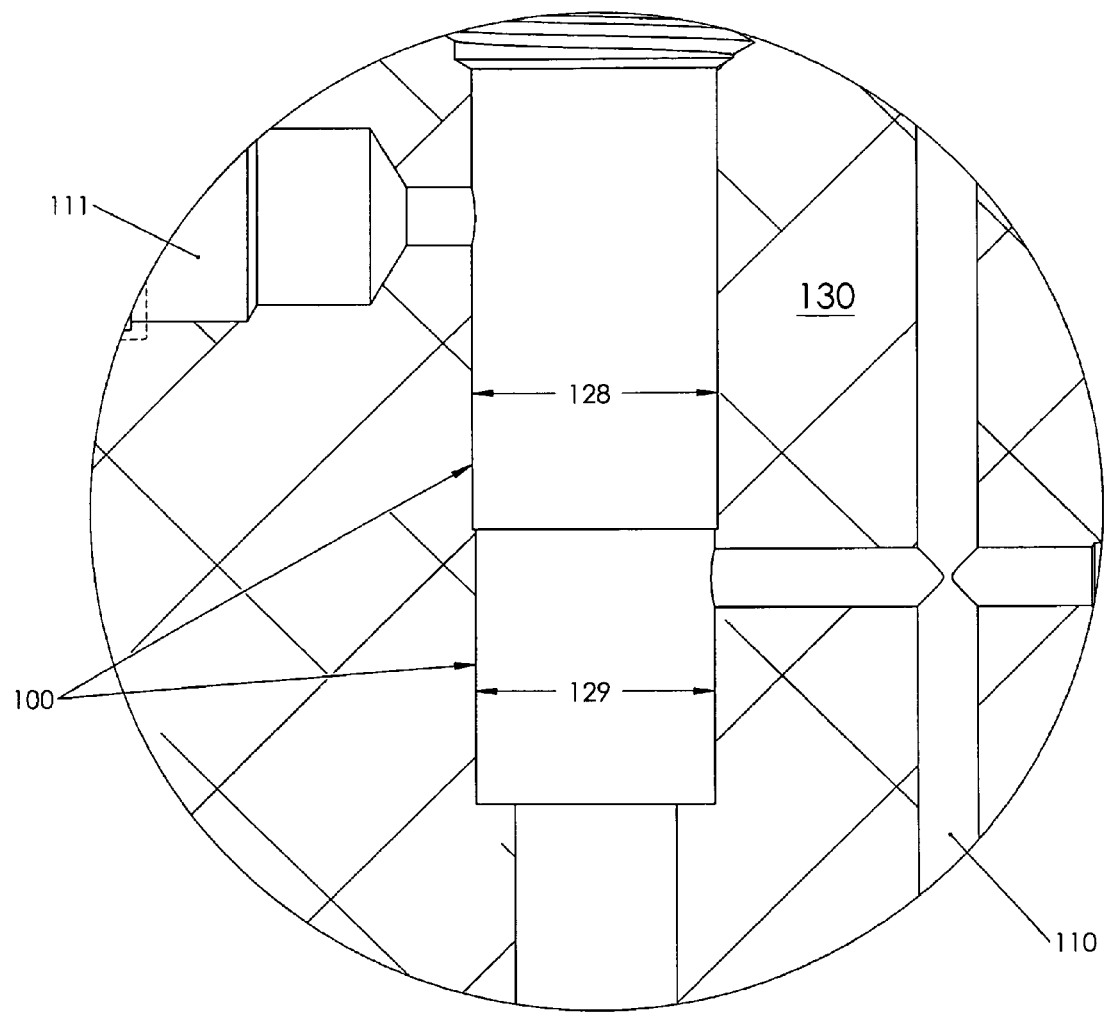
FIG. 5 is a cross sectional detail view of a chamber used to receive the shuttle illustrated in FIG. 1, as used in an embodiment of the present invention.

Referring now to FIGS. 1-6, the present invention controls fluid pressure by virtue of pressures and/or forces acting upon a shuttle, or shuttle valve assembly 101 that is located in a chamber 100. The chamber 100 is uniquely configured to include a stepped bore, having two different diameters which enclose the shuttle valve assembly 101. As shown in FIG. 5, the chamber 100, located in regulator body 130, includes an upper bore diameter 128 that is slightly larger than lower bore diameter 129. The chamber 100 further incorporates an inlet port 110 for admitting fluid at unregulated pressure, and an outlet port 111 for discharge of controlled or regulated fluid pressure. Fluid communication between said inlet and outlet ports is via a valve 102 which is incorporated into the shuttle valve assembly 101.

As a result, one unique aspect of the present invention is that, unlike most conventional fluid pressure controllers and/or regulators, the present invention does not require a diaphragm as a part of the controlling or regulating mechanism. Rather, the present invention controls or regulates fluid pressure at the chamber outlet port 111 by forces acting upon the shuttle valve assembly 101, with these forces causing movement of the shuttle valve assembly 101 within the chamber 100 which in turn allows for fluid flow from the inlet port 110 to the outlet port 111.

Figure 1:
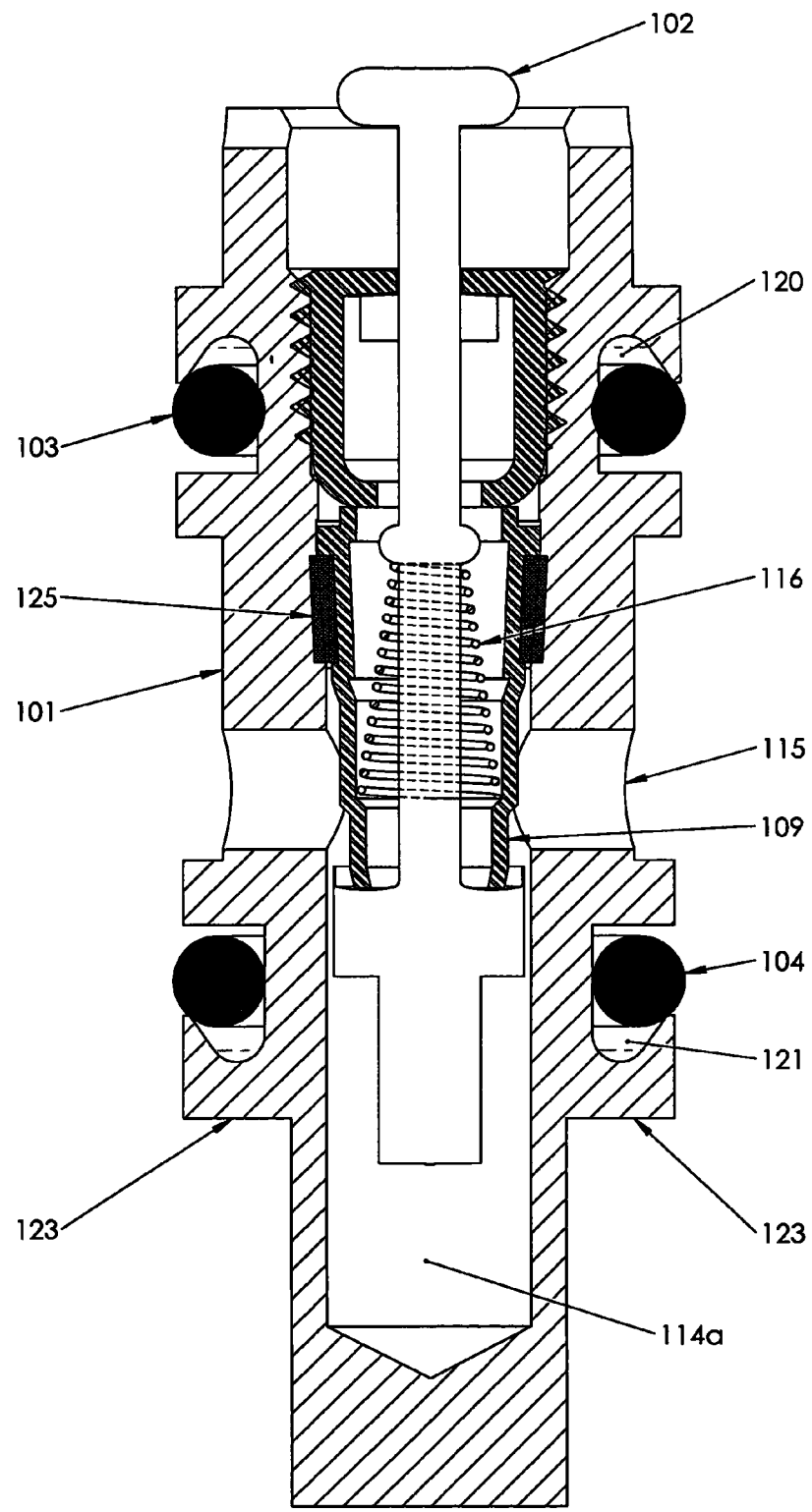
FIG. 1 is a cross sectional view of a shuttle and related internal components, comprising a shuttle valve assembly, used in an embodiment of the present invention.
Figure 2:
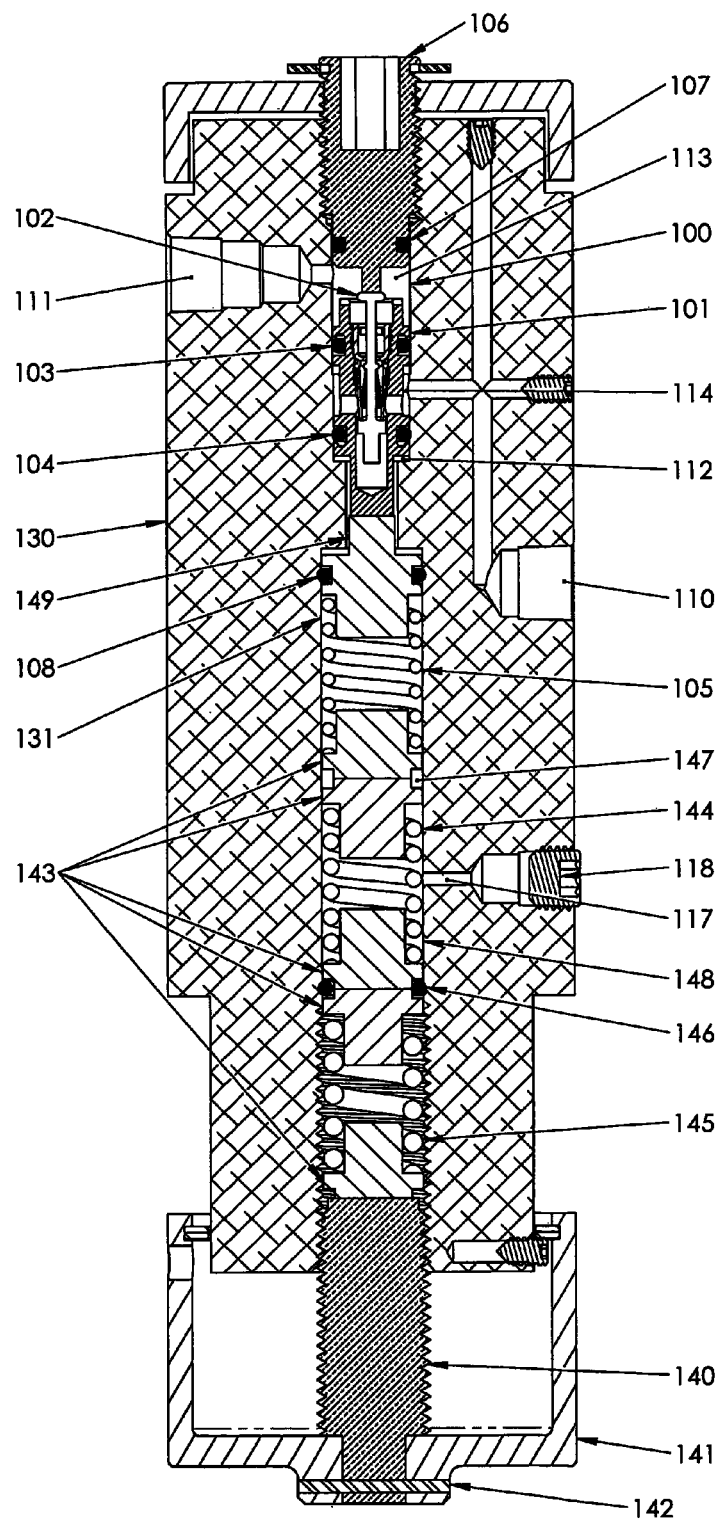
FIG. 2 is a cross sectional view of a pressure controlling regulator comprising a chamber, shuttle as illustrated in FIG. 1, and related internal components used in an embodiment of the present invention.
Figure 2A:
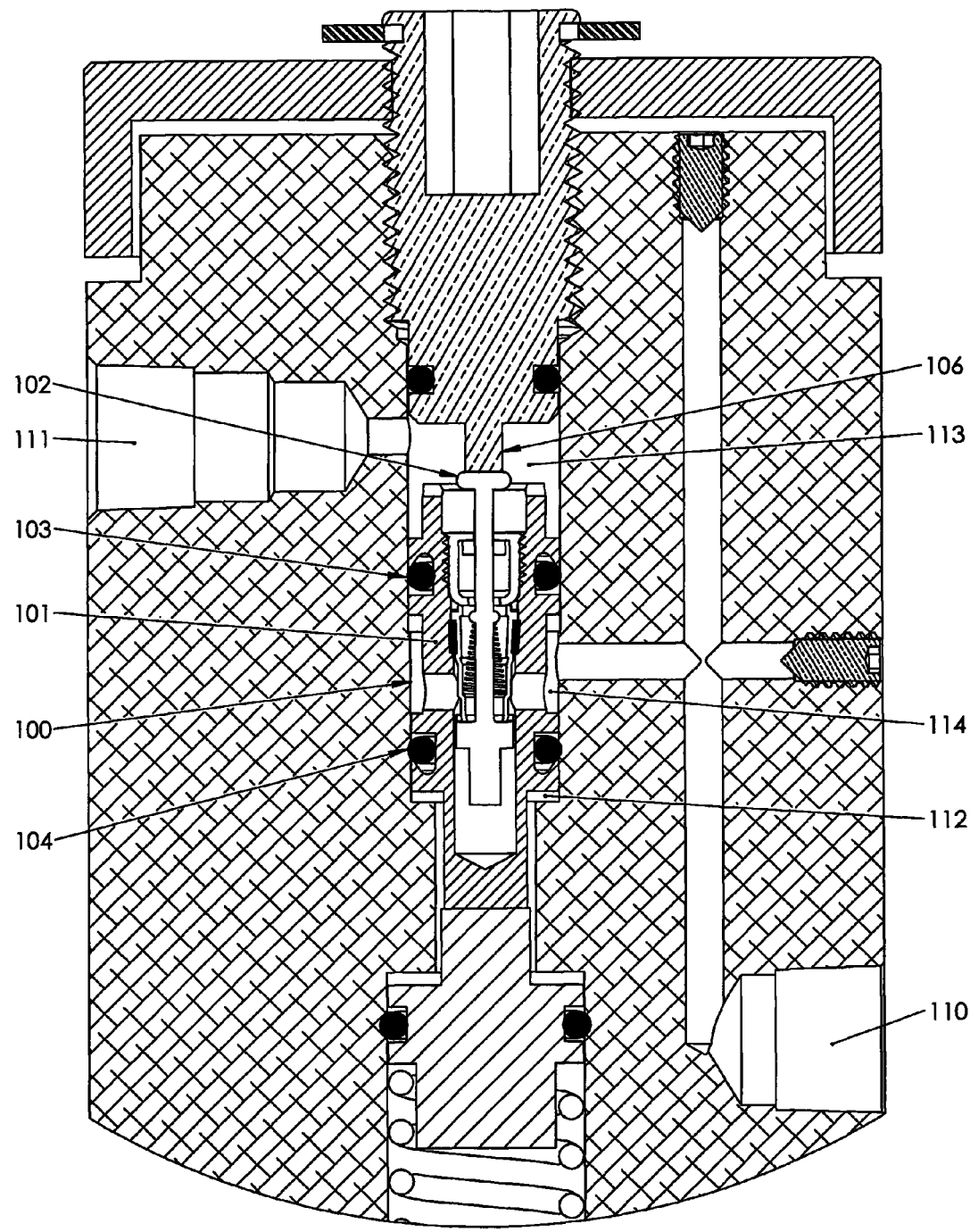
FIG. 2a is a detail cross sectional view of a pressure controlling regulator showing a chamber, shuttle as illustrated in FIG. 1, and related internal components used in an embodiment of the present invention.

As shown in FIGS. 2 and 5, an embodiment of the present invention uses a cylindrical shaped shuttle 101 that is assembled into a chamber 100 which is incorporated into a fluid regulator body 130. Regulator body 130 has an inlet port 110 for introducing fluid at any uncontrolled, unregulated and variable pressure, and an outlet or discharge port 111 for discharge of fluid at a desired regulated pressure. As shown is FIGS. 1 and 2, the shuttle 101 secures a pair of o-rings 103 and 104 in holding grooves 120 and 121, at the opposing distal ends of the shuttle 101. Referring now to FIGS. 2 and 2a, the two o-rings 103 and 104 provide moveable seals that create three fluidly isolated zones between the shuttle 101 and the chamber 100: an unregulated pressure zone 114, the biased or control zone 112, and the regulated pressure zone 113. Biased control zone 112, generally, is not exposed to any internal or externally applied fluid pressure. Further, as shown in FIG. 5, the chamber 100 has a stepped bore, with an upper bore diameter 128 being greater than a lower bore diameter 129. Put differently, the bore diameter of the chamber at the outlet or regulated pressure zone leading to the outlet port 111 differs from the bore diameter at the inlet or unregulated pressure zone leading to the inlet port 110, and also at the biased or control zones, 114 and 112, respectively (shown in FIG. 2a). This novel feature will be further described below.

The embodiment of the present invention shown in FIG. 1 further provides a valve 102 with valve inlet 109, which is assembled into and incorporated into shuttle 101. Valve 102 is preferably a Schrader valve, but the present invention is not so limited, and other types of valves may be employed. The valve 102 provides fluid communication between the inlet or unregulated zone 114 (FIGS. 1, 2, and 2a) and the regulated pressure zone 113. Said fluid communication occurs when valve 102 is forced into the opened state, which occurs when shuttle 101 is biased in the upward direction (FIG. 2). Referring now to FIGS. 1-2a, fluid from the unregulated pressure zone 114 enters the shuttle through ports 115, flows into valve 102 at the valve inlet 109, then passes through valve 102 interior to reach the regulated pressure zone 113. Such fluid communication is typical of a Schrader valve, which includes a ring seal 125. Further as shown in FIG. 2 and in greater detail in FIG. 2a, in the regulated pressure zone 113, there is an adjuster screw 106 incorporating a reduced diameter pin which impinges upon valve 102. Adjuster 106 is further sealed against the chamber 100 walls by a third o-ring 107. Adjuster 106 is optionally set to enable some vertical float of shuttle 101. Preferably, at the point of impingement of valve 102 to adjuster 106, and with valve 102 in the closed position, there should exist a small gap, shown at 112.

The present invention embodied in FIGS. 1-2 controls fluid pressure through the application of hydraulic and mechanical forces acting on the shuttle 101. In the embodiment of the present invention in FIGS. 1-2, resultant forces on the distal end of the shuttle 101 will produce movement or displacement of shuttle 101 relative to the chamber 100. In the embodiment in FIG. 2, one type of force placed on the shuttle on the distal end in the control zone 112 can be a mechanical force provided by a plurality of springs 105, 144 and 145 (shown in FIGS. 2-2a). As will be shown later, the applied bias force at control zone 112 provides the pressure adjusting means for setting a desired regulated pressure. Now referring to FIG. 2, regulator body 130 incorporates bore 131 which bounds and contains a train of springs 105, 144, and 145. Although three (3) springs are shown in the present embodiment, it is important to note that the present invention is not restricted to this number. Spring rests 143 and 149 are located at the distal end of each spring and include a stepped diameter feature to pilot the inner diameter of springs 105, 144, and 145 respectively, and provide for smooth movement of the springs without binding in bore 131. Spring rest 149 includes an additional stepped diameter on the opposite distal end to engage and remain in contact with the distal end of shuttle 101. Further, the spring pilots of elements 143 and 149 are of sufficient length such that they will contact each other before any binding of the spring coils, thereby preventing any damage to the springs 105, 144, and 145 when the spring train becomes fully compressed. At the opposite end of the spring train, pressure adjuster 140 engages a threaded portion of bore 131 and is threadably engaged sufficient to contact the spring train (FIG. 2). Adjuster 140 is further attached to pressure setting hand wheel 141 and secured thereto by pin 142. Further in the embodiment of the present invention shown in FIG. 2, springs 105, 144, and 145 are intentionally shown to be of differing wire diameter as these are intended to offer different force constants or spring rates, k, with k defined as force divided by unit deflection.

In the embodiment shown in FIG. 2, spring 145 is stiffer (greater k) than spring 144, which is in turn stiffer than spring 105. In the present embodiment shown in FIG. 2, having 2 or more springs of different spring rates assembled into a series train has the advantage of applying very small control or biasing force to shuttle 101, or optionally very large biasing force. In the present embodiment shown in FIG. 2, small bias or control forces are desired to control or regulate low pressures, on the order of a few pounds per square inch, while large bias forces are desired to control or regulate high pressures, on the order of a few thousand pounds per square inch. An ability to regulate very low to very high pressures is an attractive feature of the present invention. While it is stressed that regulating control forces in control zone 112 provide the required function, such forces are not limited to the mechanical spring train. Further as shown in FIG. 2, in the biased or control zone 112, there is an optional biased inlet/outlet 117 which fluidly communicates with bore 131. O-rings 108 and 146 are installed on spring rests 149 and 143 respectively to create a second sealed chamber. Plug 118 seals this chamber, or, can be optionally equipped with small ports or replaced by a breather (not shown) to vent it. By removing plug 118, this optional biased inlet/outlet can be attached to an alternate source of fluid or hydraulic pressure or vacuum to provide additional bi-directional force bias to the spring train. In an alternative embodiment (not shown) plug 118 and o-ring 108 are removed allowing control zone 112 to vent any unwanted fluid pressure build-up via port 117. Optionally, plug 118 may be replaced with a fluid connection to vent the control zone to an optional container (not shown) in the event this is desired, for example, when toxic gases are involved.

Figure 3:
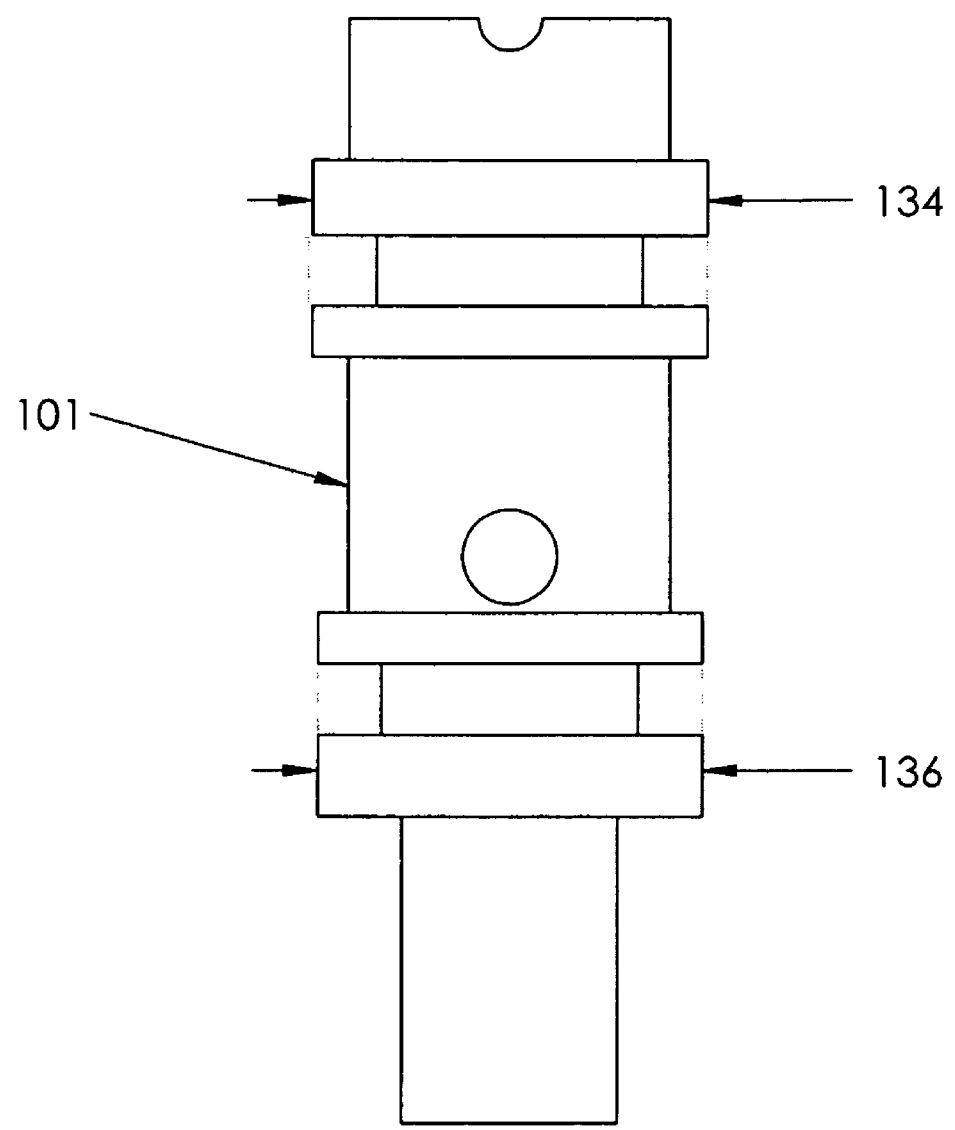
FIG. 3 is an external view of a shuttle illustrated in FIG. 1, illustrating an exterior configuration used in an embodiment of the present invention.

Further as shown in FIGS. 2, and 2a, in an embodiment of the present invention, the relative surface areas of shuttle 101 that are exposed to the different hydraulic forces at the various zones 112, 113, and 114 is an important feature of the present invention. Referring to the detail view of FIG. 2a, shuttle 101 interfaces with chamber 100 via o-rings 103 and 104. O-rings 103 and 104, however, seal to unequal respective diameters in chamber 100. These unequal diameters are illustrated in FIG. 5. O-ring 103 seals against the larger upper bore diameter 128, and o-ring 104 seals against the smaller lower bore diameter 129. As shown in FIGS. 3 and 4b, shuttle 101 is designed with a larger diameter upper collar 134 (and hence larger surface area), which is exposed to the outlet zone 113, than the shuttle's smaller diameter lower collar 136 (and hence smaller surface area), which is exposed to the inlet control zone 112.

The relationship in the relative size of the surface area of the distal ends of shuttle 101, as shown in an embodiment of the present invention in FIGS. 1 through 4 inclusive, is directly related to the size of the valve inlet 109 (FIG. 1) within shuttle 101.

In a preferred embodiment of the present invention, as shown in FIGS. 1-4, the surface area of shuttle 101 subject to hydraulic forces at the outlet zone 113 minus the surface area of the valve inlet 109 is 0.5 to 2 times the surface area of the shuttle 101 subject to a pressure force at the control zone 112.

In another embodiment of the present invention, the invention can also provide pressure regulating capabilities where the surface area of the shuttle 101 subject to hydraulic forces at the outlet zone 113 minus, or less the area of valve inlet 109, compared to the surface area of the shuttle 101 that is subject to the hydraulic forces at the control zone 112, which defines a ratio R, with the ratio R being good at a range from 0.75 to 1.5, better at range from 0.9 to 1.1, and optimal at a value of 1.0.

In an embodiment of the present invention, ratio R is defined as a desired ratio relating the diameter of the distal end of the shuttle 101 nearest the outlet zone, the diameter of the valve inlet 109, and the diameter of the distal end of the shuttle 101 nearest the control zone 112, with the following terms defined:

$D_c$=diameter of shuttle 101 at control zone 112 (FIG. 3, reference no. 136)

$D_o$=diameter of shuttle 101 at outlet zone 113 (FIG. 3, reference no. 134)

$D_v$=diameter of valve 109 (FIG. 4a)

As shown in FIGS. 1-3, preferably the diameter of the lower collar 136 of the shuttle 101 at the control zone 112, and the diameter of the upper collar 134 at the outlet zone 113, and the diameter of the valve inlet 109 define a ratio R based on the following formula:

$$R \times D_c^2 = D_o^2 - D_v^2$$

Or, $$R = (D_o^2 - D_v^2) \div D_c^2$$

In a preferred embodiment of the present invention, where the ratio R is preferably 1.0, and as shown in FIGS. 3 and 4a, the diameter of upper collar 134 is 0.385 inches [9.77 mm], the diameter of lower collar 136 is 0.375 inches [9.51 mm], and the diameter $D_v$ is 0.085 inches [2.16 mm].

As shown in FIGS. 1, 2, and 4, another example of an embodiment of the present invention uses a high pressure Schrader valve, such as a Bridgeport Core #9914 Schrader valve, as the valve 102, with a valve inlet diameter 109 of 0.085 inches [2.16 mm], #2-010-rings 103 and 104, and shuttle 101 with sealing diameters of 0.385 inches [9.77 mm] at the distal end nearest the outlet zone 113, and 0.375 inches [9.51 mm] at the distal end nearest the control zone 112. The spring train 105, 144, and 145 consisting of coil compression-type springs: 0.063 inch [1.59 mm] wire by 0.49 inch [12.70 mm] outer diameter by 0.79 inches [20.17 mm] in length spring 105; 0.080 inch [2.03 mm] wire diameter with other identical dimensions spring 144; and 0.098 inch [2.49 mm] wire diameter with other identical dimensions spring 145. #2-012 o-rings 108 and 146, and optional biased inlet/outlet port 117 provide an alternate biasing/regulating control force to distal end of shuttle 101. It should be further noted that a simpler embodiment (not shown) may consist of a single spring, such as spring 105 used in conjunction with a single element 143 and corresponding element 149, with regulator body 130 foreshortened appropriately, in the event that a narrower regulated pressure operating range and/or a lower cost device is desired. Although the dimensions and specifications just described refer to a preferred embodiment, the invention is not limited to these specific specifications, i.e., springs of differing wire diameter, outside diameter, length, etc. may be used depending on a designer's choice of regulated pressure range, operating fluid, flow rate, and so on.

Further, it should be noted that there is no limitation on the physical size of the shuttle 101, chamber 100, or any other components or elements described herein and that the examples of embodiments described herein place no limitation on the physical dimensions of the shuttle 101, chamber 100, or any other components or elements. Rather it is the ratio R, which is the important determinant of the regulating function of the invention. Therefore, much larger dimensions for the shuttle may be optionally used in the event that large regulated flow rates are desired, or in the alternative, smaller dimensions in the event that a very small regulating device is desired.

In yet another embodiment (not shown), fluid communication from the unregulated high pressure zone to the regulated pressure zone may occur through a valve element that is not located on or within the body of the shuttle 101, but through a completely separate, alternate fluid conduit. The shuttle 101 in this alternate embodiment may also be solid, i.e., a multi-diameter piston. For such an embodiment, the shuttle 101 acts as a mechanical actuator which controls the opening and closing of the valve element that is located within in the separate fluid circuit that allows fluid communication from an unregulated pressure zone 114 to a regulated pressure zone 113. However, the principle of operation of the embodiments described above still applies to this alternate embodiment. That is, the hydraulic area of the shuttle 101 at the outlet zone, or regulated pressure zone 113, minus the area of the valve 102, being preferably equal to the hydraulic area of the shuttle 101 at the control zone 112. A small piston the same size as the valve opening could also provide the necessary bias for the same stable output pressure effect. The shuttle (i.e., in this embodiment, a piston), could also be very large and thereby act counter to an equally large valve opening, allowing the principle to apply to large valve elements with attendant very high flow rates.

Referring now to FIGS. 1 through 3 inclusive, and in an embodiment of the present invention, Schrader valve 102 is contained within shuttle 101 with valve diameter 109 allowing fluid communication between unregulated fluid zone 114 and outlet zone 113. Shuttle 101 is further equipped with ports 115 which allow the fluid communication. Schrader valve 102 is generally equipped with spring 116 which provides a mechanical restoring force to keep inlet valve 109 in a normally closed position. Considering now the case where regulated outlet port 111 is open, or exposed to atmospheric pressure, and a pressurized fluid source greater than atmospheric pressure is connected at inlet port 110, and regulating pressure adjuster 140 is retracted fully such that no spring biasing force is applied to the shuttle 101 control zone distal end. In this case, zone 114a also fills to this applied pressure. Owing now to the unequal diameters of upper and lower collars, 134 and 136, respectively, a hydraulic force is applied to the shuttle 101 to displace or bias it in the upward direction and cause Schrader valve 102 to impinge on adjuster 106. Further increasing hydraulic pressure at the inlet 114 causes further upward biasing of shuttle 101 thereby opening valve 109 and allowing fluid communication into outlet zone 113. At this instant, the shuttle becomes hydraulically force-balanced, meaning, with ratio R equal to 1.0, and valve 109 no longer supporting hydraulic forces due to its opening, all other hydraulic forces acting on shuttle 101 sum to zero. This novel operation exists independent of the pressure connected at the unregulated supply connection port 110. Therefore, the remaining restoring force available in spring 116 reacts to close valve 109 and the regulator remains in a static equilibrium state. Further, in the case where outlet connection port 111 is connected to a closed system where some outlet pressure is desired to be regulated, adjuster 140 is now threadably engaged further into bore 131 causing compression of the spring train 105, 144, and 145, and thereby applying a mechanical biasing force to the distal end of shuttle 101 nearest the control zone 112. This biasing force causes an upward displacement bias of shuttle 101 creating impingement of Schrader valve 102 against adjuster 106 and opening of valve 109. This causes a fluid communication between the inlet zone 114 and the outlet zone 113, thereby pressurizing outlet zone 113. As pressure rises in outlet zone 113 to the desired regulated set pressure, the system once again becomes force balanced with the only remaining force being applied by spring 116 which again closes inlet valve 109 and restores the system to a static equilibrium state. Opening the system downstream of regulated outlet connection port 111 bleeds outlet zone 113 of pressure, causing a hydraulic imbalance, upward biasing of shuttle 101, and opening of inlet valve 109 to allow fluid communication and restore outlet zone 113 to the desired set pressure.

Referring now to FIGS. 1, 2, and 4b in an embodiment of the present invention, at least one of the upper collar sidewall 135, or the lower collar sidewall 137 of the o-ring holding grooves 120 and 121 in shuttle 101 is not perpendicular to the outer surface of the shuttle 101. Such "dovetail" grooves are common in the art of sealing designs employing o-rings. As taught in the prior art, the angled, or "dovetail" grooves are used to help retain the o-ring in its location. However, as used herein, the angled upper or lower collar sidewall, 135 and 137, respectively, serve a different function, not taught in the prior art. That is, the angled the upper or lower collar sidewall, 135 and 137, respectively, are not used to enhance retention of the o-rings, 103, 104. Instead, in the embodiment of the invention shown in FIGS. 1, 2 and 4b, it has been discovered that angling either the upper or lower collar sidewall, 135 and 137, respectively, provides smoother movement of the shuttle 101 in the chamber 100 operation by direct reduction of normal forces applied between o-rings 103 and 104, and chamber 100 walls. This reduction of normal force reduces the generated frictional forces according to the relation:

$$F_f = \mu \times N_f$$

Where:
F_f=generated frictional force
μ=coefficient of friction
N_f=normal force The reduction of frictional forces minimizes any "stick-slip" or hysteresis of shuttle 101 motion which may arise due to a small change in pressure setting, very low flow conditions, or to provide for accurate and stable control of minute changes in desired outlet pressure. In one embodiment of the present invention, optimum means minimizing the pressure induced normal forces of o-rings 103 and 104 against chamber walls 100, while still maintaining adequate sealing function and hence fluid isolation in the relevant zones isolated by the o-rings 103, 104 secured by the holding grooves, 120, 121, respectively.

Figure 6:
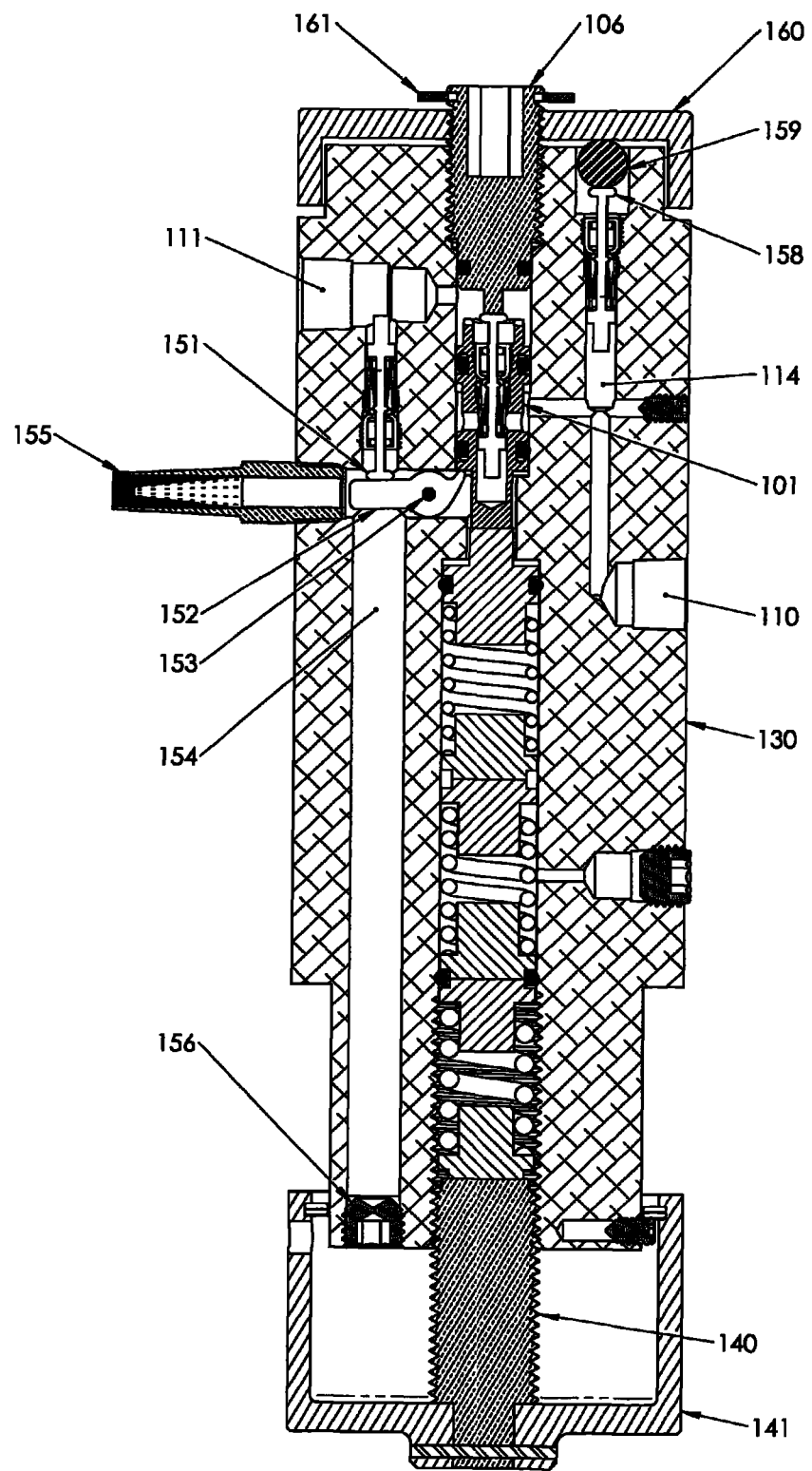
FIG. 6 is a cross sectional view of a pressure controlling regulator showing a chamber illustrated in FIG. 5, shuttle illustrated in FIG. 1, a self-adjusting pressure-following bleed feature, a manual bleed feature, and related components used in an embodiment of the present invention.

Referring now to FIG. 6, a further embodiment is detailed which incorporates a novel self-bleeding pressure-following feature, and manual bleed-down feature. Regulating devices are frequently manually set to a desired pressure, then readjusted throughout the course of use at various other set pressures. If a new set pressure is below that of a previous regulated pressure setting, the operator is typically required to perform some manner of fluid bleed of the downstream system while also fine tuning the set pressure as desired. In many cases, however, the downstream system is sealed causing the operator to "break" connections or install an auxiliary bleed valve. Further, if it is desired to remove the regulator from the unregulated high pressure source after use, it is commonplace to again perform some manner of downstream fluid bleed in order to discharge high pressure fluid from within the regulator before removal. The present invention obviates these needs.

In the embodiment shown in FIG. 6, pressure-following Schrader valve 151 is operated by activating lever 152, which pivots on pin 153 and bears against the shoulder 123 of shuttle 101 (shown in FIG. 4b). Displacement of shuttle 101 occurs during regulating operation as previously described. Alternate set pressures are achieved by adjusting screw 140 via a handwheel 141, which applies axial forces to the spring train and distal end of shuttle 101 causing displacement of same. If an increased set pressure adjustment is made, shuttle 101 will momentarily displace upward. If a decreased set pressure adjustment is made, shuttle 101 momentarily displaces downward due to the regulated pressure zone 111 force imbalance. This causes shoulder 123 of shuttle 101 to bear against a distal end of lever 152, which in turn opens Schrader valve 151, and automatically bleeds regulated pressure zone 111. Fluid bleed is then communicated into bore 154 which is sealed by plug 156 and ultimately exhausted through vent 155. Bore 154 further provides means for installing Schrader valve 151. In an alternative embodiment, vent 155 can be replaced with a fitting and conduit (not shown) to conduct fluid bleed to a separate container. Such may be desired to prevent, for example, escape of toxic or explosive gas into the surroundings. When the desired set pressure is attained, shuttle 101 displaces upward and returns to the equilibrium position. Upward displacement of shuttle 101 relieves forces from the distal end of lever 152, and allows pressure-following Schrader valve 151 to close. In this manner, changes in regulated set pressures are immediately and automatically attained, whether set pressure adjustment is increasing or decreasing.

In the embodiment of FIG. 6 is a novel manual bleed-down feature which may be activated to bleed and vent unregulated fluid pressure before removing the regulator from a high pressure source. Such may be desired in the alternative of venting by way of decoupling fluid connections, at 110 for example, while they are under high pressure. Operatively, zone 114 contains fluid under pressure from an unregulated source, which is sealed by, among others, Schrader valve 158. Bearing ball 159 rests atop Schrader 158 in an appropriately sized cavity which captures it, and bears against handwheel 160, which is threadably connected to adjustment screw 106. Handwheel 160 operates independent of adjustment screw 106 and has no effect on any regulator adjustment function. Snap ring 161 prevents handwheel 160 from completely disengaging screw 106. Bleed-down is accomplished by operating handwheel 160 against bearing ball 159 to open Schrader valve 158, and effect fluid communication from unregulated pressure zone 114 to atmosphere. Once bled, handwheel 160 is operated in the reverse direction until contacting snap ring 161, ensuring closure of Schrader valve 158. The regulator may then be safely decoupled from the unregulated pressure source.

As disclosed above, a number of embodiments of a fluid pressure regulating apparatus are described. One embodiment comprises an apparatus having a chamber having a first bore diameter, a second bore diameter, a fluid inlet for receiving fluid at an unregulated pressure, and a fluid outlet for discharging fluid at a regulated pressure. A shuttle assembly is located in the chamber, the shuttle assembly including a valve that is in fluid communication with both the fluid inlet and the fluid outlet, and a first sealing member located at an upper portion of the shuttle assembly and a second sealing member located at a lower portion of the shuttle assembly. An unregulated pressure zone communicates with the fluid inlet, a regulated pressure zone communicates with the fluid outlet and a fluid pressure control zone communicates with a portion of the shuttle assembly, the fluid pressure control zone controlling the regulated pressure at the fluid outlet. Where a hydraulic area of the shuttle at the regulated pressure zone, minus an area of the valve is substantially equal to a hydraulic area of the shuttle at the fluid pressure control zone. The valve may be a Schrader valve, and the chamber is located in a body of a fluid pressure regulator. The fluid may be either a gas or a liquid. A surface area of the shuttle assembly subject to the regulated fluid pressure at the fluid outlet minus a surface area of the a valve inlet is equal to 0.5 to 2 times a surface area of the shuttle assembly subject to the fluid pressure control zone.

Also, the regulated pressure at the fluid outlet is adjusted by a moveable pressure adjuster. Each of the first sealing member and the second sealing member is an O-ring. Also, the fluid pressure regulating apparatus may further include an upper collar adjacent to the first sealing member and a lower collar adjacent to the second sealing member and a sidewall located on both the upper collar and the lower collar, the sidewall adjacent to the chamber, with the sidewall angled relative to the chamber.

Another embodiment of a fluid pressure regulating apparatus comprises a chamber comprising an inlet for introducing gaseous or fluid material and an outlet for discharging gaseous or fluid material, a valve providing fluid communication between the inlet and outlet, a shuttle inside the chamber, the valve inlet being located on or in the shuttle, a first seal between the chamber and the shuttle, the first seal preventing fluid communication between the inlet and outlet except through the valve inlet, the first seal further defining an outlet zone in the chamber, a second seal between the chamber and the shuttle defining a control zone in the chamber, the second seal preventing fluid communication between the inlet and the control zone, a control pressure being applied to the shuttle in the control zone and where a surface area of the shuttle subject to the fluid pressure at the outlet zone minus a surface area of the valve inlet is equal to 0.5 to 2 times a surface area of the shuttle subject to the control pressure.

In the above embodiment the valve is a Schrader valve, and a surface area of the shuttle subject to the fluid pressure at the outlet zone minus a surface area of the valve inlet is equal to 0.75 to 1.5 times a surface area of the shuttle subject to the control pressure. Alternatively, a surface area of the shuttle subject to the fluid pressure at the outlet zone minus a surface area of the valve inlet is substantially equal to a surface area of the shuttle subject to the control pressure. The fluid pressure at the outlet zone is further adjusted by a moveable pressure adjuster. And, the shuttle is substantially cylindrical, and includes at least two different diameters at its distal ends, the distal end with the larger diameter defining the surface area of the shuttle subject to the fluid pressure at the outlet zone, the distal end with the smaller diameter defining the surface area of the shuttle subject to the control pressure. The control pressure is generated by a spring, at least one seal is an o-ring, and the o-ring is secured in a groove in the shuttle, where a base of the groove in the shuttle securing the o-ring is wider than a top of the groove.

Another fluid pressure control apparatus comprises a chamber with an inlet for introducing fluid and an outlet for discharging fluid, a valve, a shuttle inside the chamber, the shuttle having an opening for the valve through which the valve can provide fluid communication between the inlet and outlet, a first seal between the chamber and the shuttle, the first seal preventing fluid communication between the inlet and outlet except through the valve, and the first seal further defining an outlet zone subject to a force present at an outlet region of the chamber, the outlet region partially defined by the first seal, a second seal in the chamber defining a control zone, the second seal further preventing fluid communication between the inlet and the control zone, a control force applied to the shuttle at the control zone and where a surface area of the outlet zone on the shuttle that is subject to the outlet force minus a surface area of the opening for the valve being equal to 0.5 to 2 times a surface area of the control zone of the shuttle that is subject to the control force. In one embodiment the valve is a Schrader valve.

Thus, it is seen that a fluid pressure control device is provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A fluid pressure regulating apparatus, comprising:
a chamber comprising a first area and a second area, the second area larger than the first area;
an inlet port communicating with the first area, the inlet port structured to receive a fluid at an unregulated pressure;
an outlet port communicating with the second area, the outlet port structured to dispense the fluid at a regulated pressure;
a shuttle assembly located in the chamber, the shuttle assembly moveable during operation of the fluid pressure regulating apparatus, the shuttle assembly comprising:

a first Schrader valve that is in fluid communication with both the inlet port and the outlet port, the first Schrader valve including a pin element that moves relative to the shuttle assembly and abuts an adjustable pressure release element to open the first Schrader valve when the shuttle assembly moves during operation;

an unregulated pressure relief element comprising a second Schrader valve communicating with the inlet port; and a regulated pressure relief element comprising a third Schrader valve communicating with the outlet port.

2. The fluid pressure regulating apparatus of claim 1, where the unregulated pressure relief element comprises:

a second chamber in fluid communication with the inlet port, the second chamber including a second Schrader valve that allows the fluid at the unregulated pressure to escape from the fluid pressure regulating apparatus.

3. The fluid pressure regulating apparatus of claim 1, where the regulated pressure relief element comprises:

a third chamber in fluid communication with the outlet port, the third chamber including a third Schrader valve that allows the fluid at the regulated pressure to escape from the fluid pressure regulating apparatus.

4. The fluid pressure regulating apparatus of claim 1, where the third Schrader valve is operated by the shuttle assembly.

5. The fluid pressure regulating apparatus of claim 1, further comprising a fluid pressure setting element abutting the shuttle assembly, the fluid pressure setting element structured to adjustably set a fluid pressure of the fluid pressure regulating apparatus.

6. The fluid pressure regulating apparatus of claim 1, where the fluid pressure regulating apparatus can regulate a fluid selected from a group consisting of: a liquid and a gas, and a combination of a liquid and a gas.

7. A fluid pressure regulating apparatus, comprising:

a chamber comprising a first bore diameter, and a second bore diameter adjacent and concentric to the first bore diameter, the second bore diameter larger than the first bore diameter;

a fluid inlet for receiving a fluid at an unregulated pressure;

a fluid outlet for discharging the fluid at a regulated pressure;

a shuttle assembly located in the chamber, the shuttle assembly moveable during operation of the fluid pressure regulating apparatus, the shuttle assembly comprising:

a) a first Schrader valve that is in fluid communication with both the fluid inlet and the fluid outlet, the first Schrader valve including a pin element that moves relative to the shuttle assembly and abuts an adjustable pressure release element to open the first Schrader valve when the shuttle assembly moves during operation;

b) a first sealing member located at an upper portion of the shuttle assembly; and c) a second sealing member located at a lower portion of the shuttle assembly;

an unregulated pressure zone communicating with the fluid inlet;

a regulated pressure zone communicating with the fluid outlet;

a fluid pressure control zone communicating with a portion of the shuttle assembly, the fluid pressure control zone including a plurality of springs that communicate with a portion of the shuttle assembly, the fluid pressure control zone and the plurality of springs structured to variably control the regulated pressure at the fluid outlet;

a second Schrader valve in fluid communication with the fluid outlet and a fluid outlet relief vent; and a third Schrader valve in communication with the fluid inlet and a fluid inlet relief vent.

8. The fluid pressure regulating apparatus of claim 7, where a hydraulic area of the shuttle assembly at the regulated pressure zone, minus an area of the first valve, is equal to a hydraulic area of the shuttle assembly at the fluid pressure control zone.

9. The fluid pressure regulating apparatus of claim 7, where the fluid is selected from a group consisting of: a gas and a liquid, and a combination of both a liquid and a gas.

10. The fluid pressure regulating apparatus of claim 7, where the regulated pressure at the fluid outlet is set by a moveable fluid pressure adjuster.

11. The fluid pressure regulating apparatus of claim 7, where the regulated pressure at the fluid outlet is set by a hydraulic pressure acting on the shuttle assembly.

12. The fluid pressure regulating apparatus of claim 7, further comprising:

an upper collar adjacent to the first sealing member and a lower collar adjacent to the second sealing member; and a sidewall located on both the upper collar and the lower collar, each sidewall adjacent to the chamber, with each sidewall angled relative to the chamber.

* * * * *